Dec. 13, 1960  H. MULTHOPP  2,964,264
POWER FLAP FOR AIRCRAFT
Filed Jan. 27, 1956  6 Sheets-Sheet 1

INVENTOR.
HANS MULTHOPP
BY
ATTORNEY

Dec. 13, 1960

H. MULTHOPP 2,964,264

POWER FLAP FOR AIRCRAFT

Filed Jan. 27, 1956

INVENTOR.
HANS MULTHOPP
BY
*Julian C. Renfro*
ATTORNEY

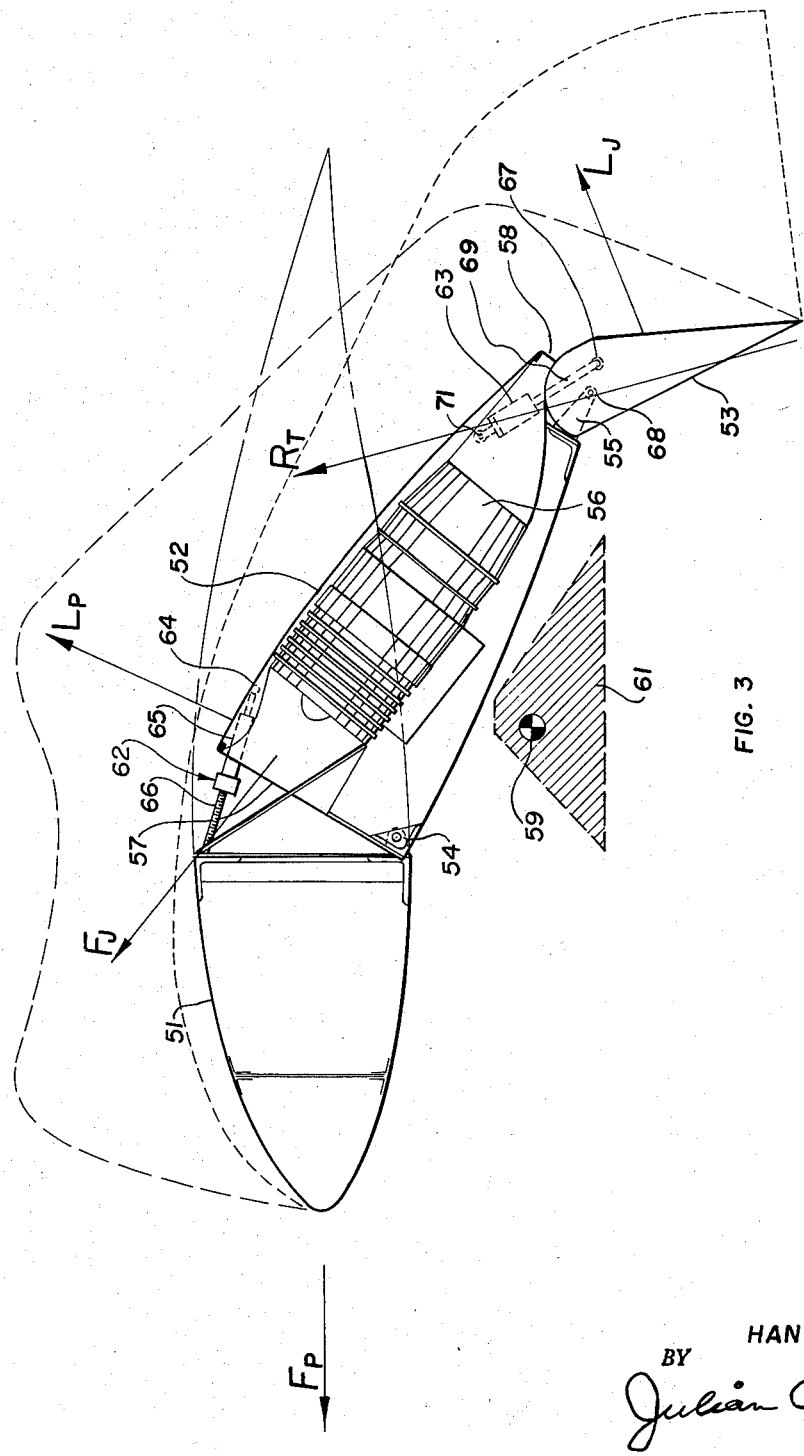

Dec. 13, 1960 H. MULTHOPP 2,964,264
POWER FLAP FOR AIRCRAFT
Filed Jan. 27, 1956 6 Sheets-Sheet 4

INVENTOR.
HANS MULTHOPP
BY
Julian C. Renfro
ATTORNEY

Dec. 13, 1960     H. MULTHOPP     2,964,264
POWER FLAP FOR AIRCRAFT
Filed Jan. 27, 1956     6 Sheets-Sheet 5

INVENTOR.
HANS MULTHOPP
BY
ATTORNEY

Dec. 13, 1960    H. MULTHOPP    2,964,264
POWER FLAP FOR AIRCRAFT
Filed Jan. 27, 1956    6 Sheets-Sheet 6

INVENTOR.
HANS MULTHOPP
BY
Julian C. Renfro
ATTORNEY

United States Patent Office 2,964,264
Patented Dec. 13, 1960

2,964,264
POWER FLAP FOR AIRCRAFT

Hans Multhopp, Overlea, Md., assignor to The Martin Company, a corporation of Maryland Filed Jan. 27, 1956, Ser. No. 561,809

7 Claims. (Cl. 244—12)

This invention relates to an aircraft designed to fly at wide range of speed, and more particularly to a lift-producing arrangement that is to be known as a "power flap." This arrangement is incorporated into the wing of an aircraft, and used during low speed flying, such as during takeoff and landing.

It is well known that man-carrying aircraft can be made that will ascend vertically from takeoff point, and follow a substantially vertical path when landing. The best known device having such flight characteristics is known as the helicopter, and this type of aircraft employs a large rotor to deflect a substantial mass of air per-unit-time downward at a relatively low velocity. The helicopter has proven invaluable in rescue operations and other instances in which vertical or almost vertical flight is necessary, but it is not without the disadvantage of having its rotor axis perpendicular to the flight path, which seriously limits the high speed potential of such an aircraft.

Conventional fixed-wing aircraft require ground runways of substantial length so that sufficient speed can be attained for the wings to produce adequate lift for takeoff. Since maximum lift is described by the formula $L = \frac{1}{2} \rho S C_{L_{max}} V^2$, it is apparent that for a given air density $\rho$, wing area $S$, and maximum lift coefficient $C_{L_{max}}$, that lift is proportional to the square of the velocity. As to the distance required for takeoff, such distance is proportional to the square of the weight, and inversely proportional to the product of $SC_{L_{max}}$ and the horizontal accelerating force available (thrust minus drag).

By increasing the wing area $S$, lift can be increased, and the distance required for takeoff decreased. However, there is a limit to the amount that the takeoff distance can be reduced by increasing the wing area, due to the fact that there is an increase in weight and drag necessarily associated with substantial increases in wing area. Therefore, the improving of the maximum lift coefficient appears to be the most promising way of increasing the lift so as to decrease the required takeoff distance and speed.

Some indication of required takeoff distance can be obtained from a comparison of the maximum lift coefficient for various aircraft wing configurations. Depending on its thickness and its camber, an ordinary aircraft wing will have an approximate value of $C_{L_{max}}$ between 0.8 and 1.6 whereas a fairly thick wing equipped with flaps may have a $C_{L_{max}}$ of 3 or 4. By controlling the boundary layer of the wing by means of a suction or blowing arrangement, an even higher value of $C_L$ can be obtained, and when this arrangement is used in conjunction with flaps, values of $C_L$ up to approximately 7 have been achieved.

Another way of improving low speed flight conditions is to utilize the propulsive system of the aircraft for lift generation. In the case of a propeller-driven airplane, this is most effectively done by deflecting the propeller slipstream downwardly by means of wing flaps. National Advisory Committee for Aeronautics tests (NACA TN 3307, 1954) have shown that deep double hinged flaps are particularly suitable in this regard.

In aircraft having jet power plants, lift can be increased by deflecting the jet thrust downwardly to the greatest extent practicable. It has also been found that directing the exhaust gases of a jet engine near the trailing edge of the wing through a nozzle arrangement extending along the wing span induces additional lift capabilities of the wing much above and beyond the values obtainable when utilizing flaps and boundary layer control only. This effect is referred to as "supercirculation" by aerodynamicists.

By the use of this invention, the known beneficial effects of direct lift through thrust, supercirculation, and slipstream deflection are correlated in a most advantageous manner. This involves an important practical aspect: it is most necessary to have the total lift force created at low speeds acting close to the center of gravity of the aircraft in order to avoid large control problems.

According to this invention, at least one air-breathing jet propulsion device is mounted in a flap in each wing of the aircraft, the arrangement being such that when the flaps are deflected downwardly, the aft end of each device is lowered to a position wherein the line of thrust of the device is upward at a substantial angle with the horizontal. The exhaust of the devices is directed to flow over the upper surface of the trailing edge of the wing or over the upper surface of a trailing edge flap, and this causes the formation of a substantial negative pressure at this location, which in turn brings about marked increase in the lift of the wing.

In addition to this, when the wing flaps have been deflected, the flow of air over the wing is redirected downwardly, and particularly if this air flow represents propeller slipstream, increased lift can be obtained. The air inlets of the jet propulsion devices can be located in the upper surface of the wing, and in such event, there is a removal of some of the boundary layer when these devices are in operation.

At a specified minimum speed, the lifting capabilities of the instant wing-powerplant combination utilizing ten jet engines in each wing were about 6 to 8 times as great as the lifting capabilities of the basic wing with conventional flaps. In the case of transport aircraft, this has resulted in very substantial reduction in wing size and in weight of both the basic airframe and of the fuel that has to be carried in order to fly a given distance.

According to further details of the present invention, when the wing flaps are in deflected position, the air inlets and the exhaust gas outlets of the jet propulsion devices are exposed. The exhaust gases emanating from said outlets have a substantial downward velocity component due to the deflected positions of said flaps, and said gases flow over the trailing edges of the wings so as to induce the airstream to flow closely over the chordwise length of the upper surface of the respective wing without separation.

Although a single flap that contains the jet propulsion devices could be employed on each wing, double flaps are preferably used, with the jet propulsion devices located in the first flap, and with the exhaust gases emanating from the devices arranged to flow over the upper surface of the second, or trailing edge flap. This flow of exhaust gases has the effect of creating a large negative pressure distribution over the rear portion of the wing, which increases the negative pressure above the main part of the wing, thereby increasing very substantially the lift.

A principal object of this invention is to provide a lift-producing arrangement to be incorporated into the wing of a fixed-wing aircraft, that will enable an aircraft so equipped to take off in very short distances, to fly at very low speeds, and to have good low speed lateral stability.

Another object of this invention is to provide at least one jet-propulsion device mounted in a wing flap of each wing of an aircraft, to produce thrust that will have a substantial upward component when the flaps have been deflected, thereby enabling a fixed-wing aircraft to have very low takeoff and landing speeds.

Another object of this invention is to provide an ancillary lift-producing arrangement located in the wing flaps of a fixed-wing aircraft, to be used in addition to the principal power plant or power plants of the aircraft during low speed flight. Not only does this arrangement increase the available thrust of the aircraft but also it improves the characteristics of the airstream flowing over the wings of an aircraft, i.e., it brings about supercirculation, thereby increasing the aerodynamic lift of the wings.

Still another object of this invention is to provide an ancillary lift-producing arrangement for a fixed-wing aircraft that will have a lift component that will act close to the center of gravity of the airplane, thereby obviating the need for large stabilizing surfaces to dynamically balance the airplane during flight.

Yet another object of this invention is to provide an ancillary lift-producing arrangement wherein at least one ancillary engine is provided in the principal wing flaps of each wing, with each ancillary engine being supported from an individual panel of the skin of the wing flap. By virtue of such an arrangement, an ancillary engine can be quickly removed from the wing flap for servicing or repair, without it being necessary to disturb the remaining ancillary engines.

Still another object of this invention is to provide an ancillary thrust-producing arrangement for the wings of an aircraft wherein a plurality of ancillary jet engines are provided in each principal flap of the wings of the aircraft, each flap being subdivided in the spanwise direction so that the ancillary engines can be selectively operated without it being necessary for all the flaps containing ancillary engines to be moved into the deflected, or operating position.

Other objects, features, and advantages of this invention will be apparent from the following detailed description and the accompanying drawings of illustrative embodiments of the invention.

Figure 3 is a side elevation view partly in section of a first modification of a power flap arrangement according to this invention, showing the first and second flaps in the deflected position, with the chordwise load distributions created by the propeller slipstream and by the jet exhaust being indicated by separate dashed lines. This figure also indicates by means of vectors, the principal lift and thrust forces of the wing.

Figure 4:
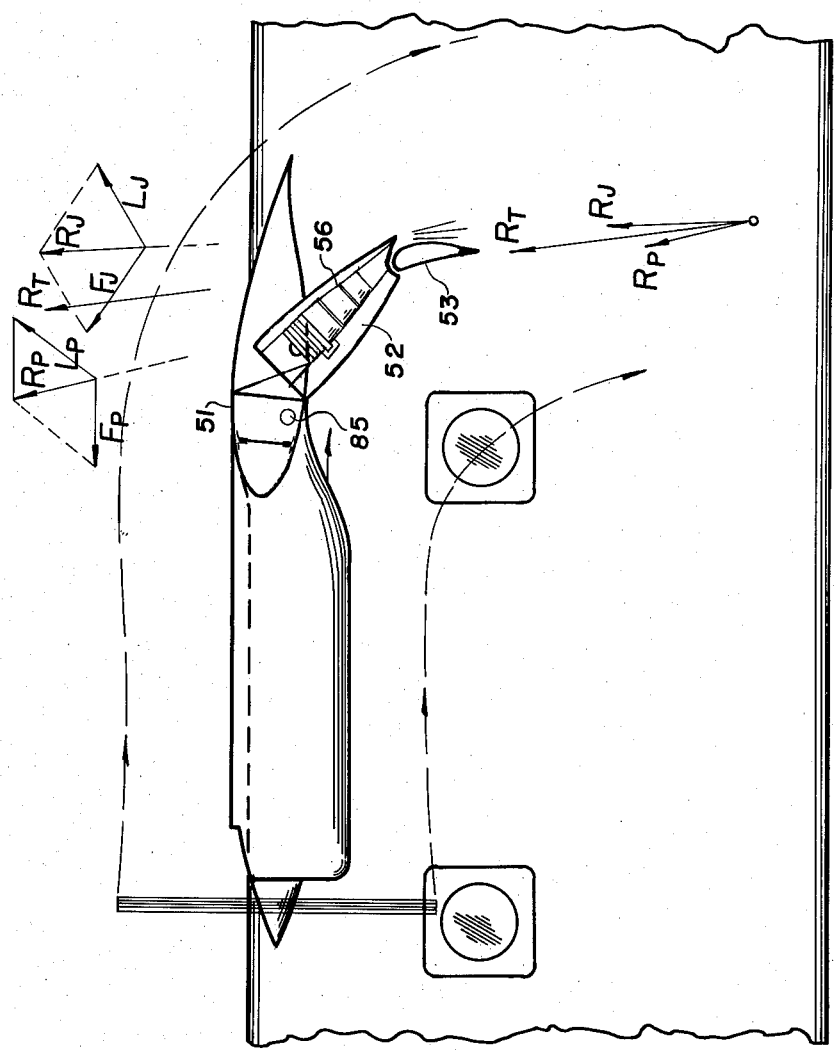
Figure 5:
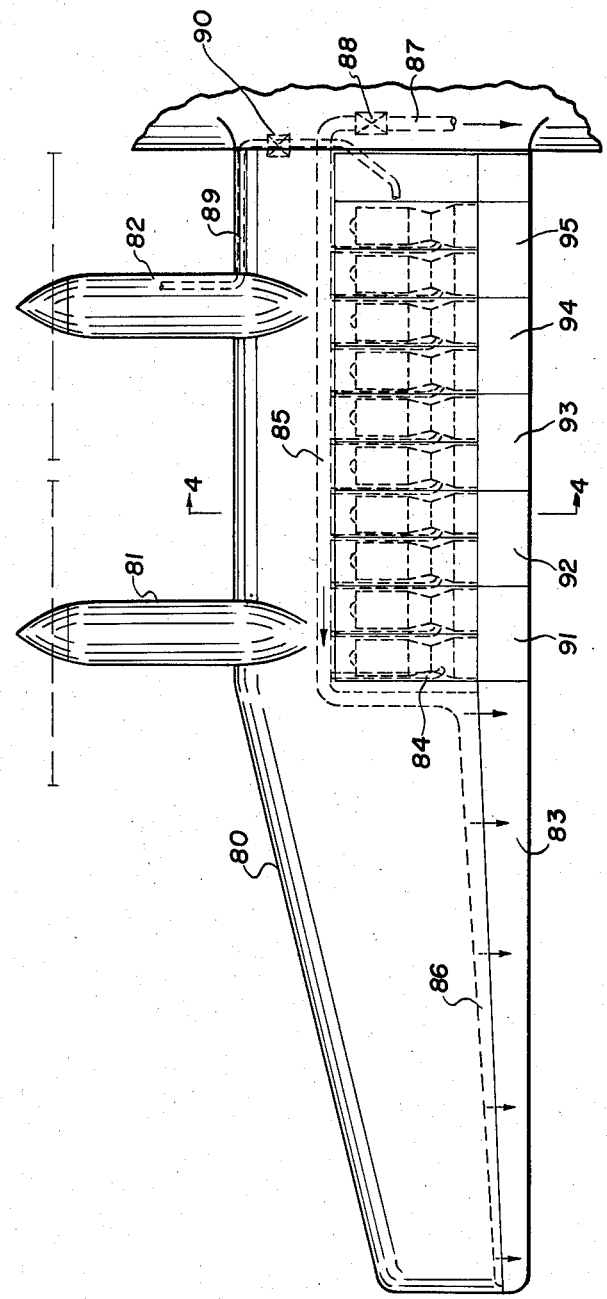
Figure 6:
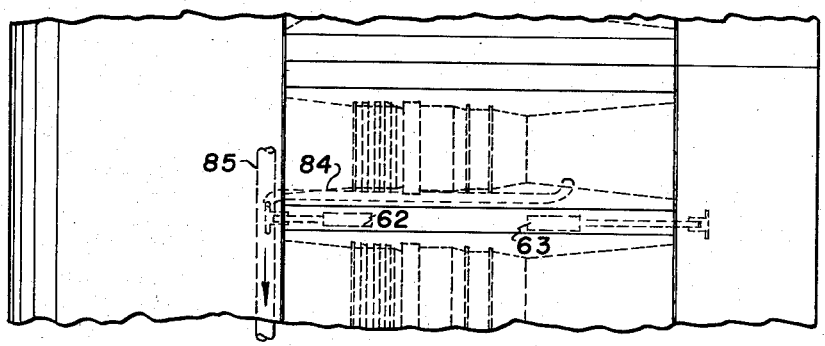
Figure 7:
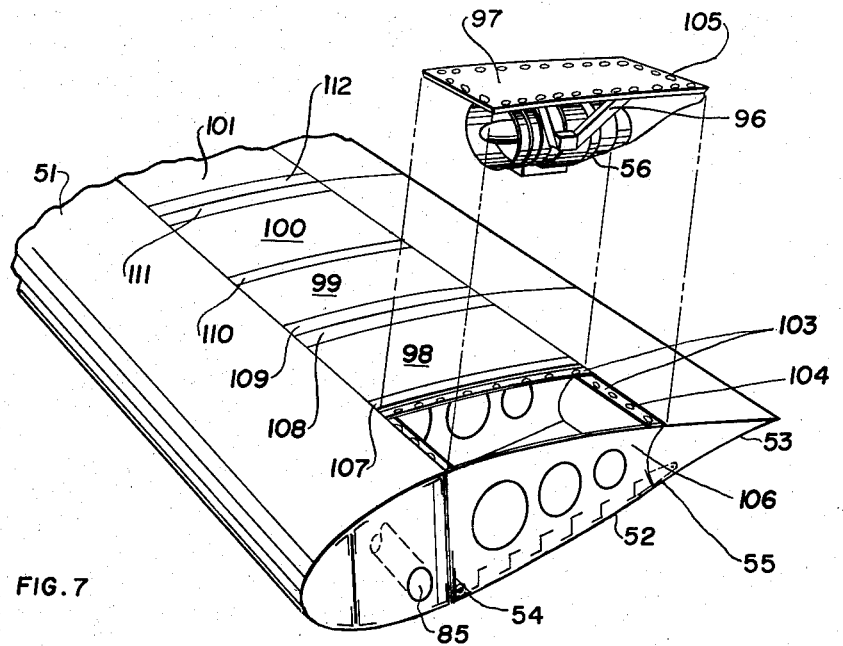

Figure 4 is a vertical cross section taken along line 4—4 of Fig. 5, showing a power flap arrangement according to this invention embodied in a transport type airplane;

Figure 5 is a plan view of the left wing of an airplane, illustrating the placement of a plurality of ancillary engines in the first wing flap at a location behind the principal engines, and also showing the spanwise subdivision of the wing flaps into several individual sections;

Figure 6 is a fragmentary plan view of a portion of the wing shown in Fig. 5, illustrating a second type of actuating mechanism, and the high pressure conduits of the wing; and Figure 7 is a perspective view of a wing portion in which a number of ancillary engines are located, illustrating by means of an exploded view, one engine with respect to the wing to indicate how the ancillary engines are individually supported by sections of the upper skin of the wing flap.

Figure 1:
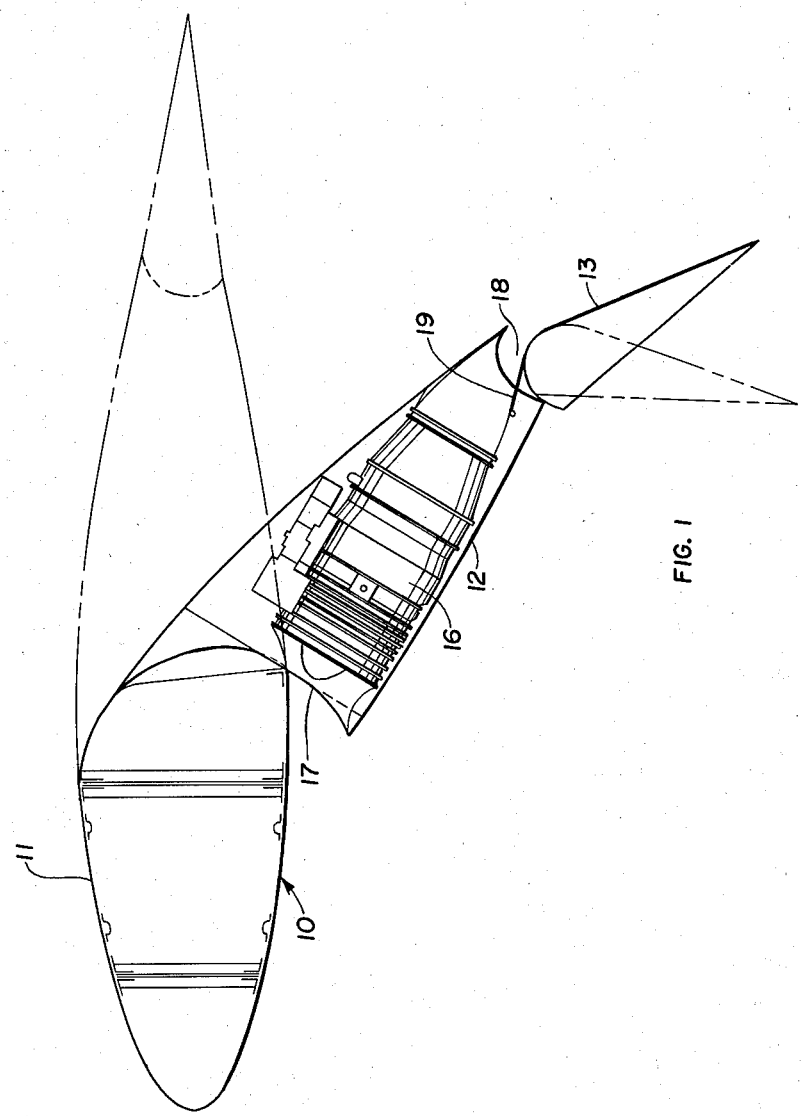
Figure 1 is a side elevation view partly in section of a preferred embodiment of a power flap arrangement according to this invention, showing the first and second flaps in the deflected position, and the location of an ancillary jet engine in the first flap.
Figure 2:
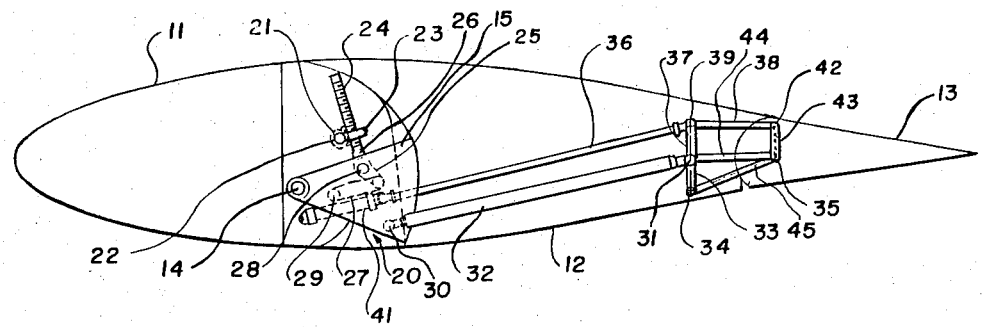
Figure 2 is a similar illustration of the embodiment of Figure 1, but taken at a wing location wherein the flap actuating mechanism is located.
Figure 2A:
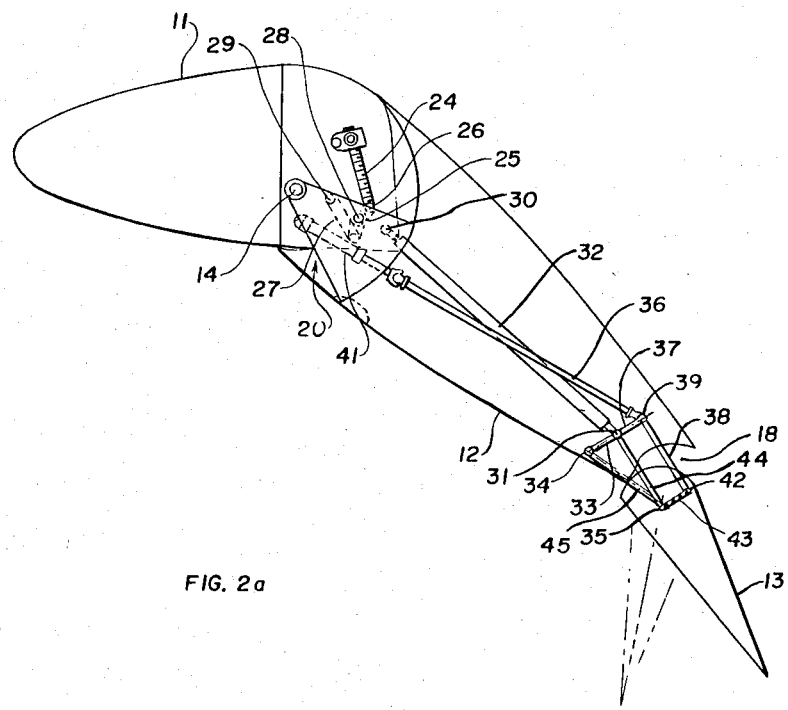
Figure 2a is identical with Figure 2 with the exception that the actuating apparatus has moved the flaps into a deflected position.

In Fig. 1 is shown a typical wing section of an aircraft in which a preferred embodiment of my invention is utilized. The wing section 10 consists of a fixed forward wing member 11, a first flap 12 and a second flap 13. Forward wing member 11 preferably has a depth less than one-half of the length of the local wing chord. First flap 12 is movably connected to rear edge of wing member 11 by means of a plurality of hinges 14, one of which is shown in Figs. 2 and 2a. Hinges 14 connect the forward portion 15 of first flap 12 with a rib of the forward wing member. In a somewhat similar manner, second flap 13 is movably connected at the rear edge of first flap 12. As illustrated in Fig. 1, a small airbreathing jet-propulsion device 16 is contained inside the first flap 12, to be used to supply ancillary thrust during low speed flight, such as during takeoff and landing. The jet-propulsion device is preferably a small gas turbine engine such as the General Electric J-85 engine, which has an installed weight of about 250 pounds, and a thrust of approximately 2450 pounds. It is to be understood, however, that other jet-propulsion devices such as a pulse jet or even a rocket engine could be used to supply ancillary thrust during the low speed regime.

Engine 16 is preferably mounted so as to have its longitudinal axis substantially parallel to the longitudinal axis of the airplane when first flap 12 is in the retracted (dashed line) position, so it is therefore necessary that the engine be moved to a deflected position such as the position shown in full lines in Fig. 1 when it is to be operated. An inlet 17 for engine 16 is provided at the front end of second flap 13 beneath fixed forward member 11, so that when the first flap has been moved to a deflected position, sufficient air for satisfactory operation can be inhaled through this inlet by the ancillary engine. Outlet 18 is provided at the upper aft end of flap 12, the outlet being located in such a position that when the flaps are deflected into an operating position, the products of combustion emanating from engine 16 during its operation will flow over the upper surface of second flap 13 so as to induce the airstream to flow closely over the chordwise length of the upper surface of the respective wing without separation, and this has the effect of increasing the lift of the wing by a marked degree. The portions of the second flap that are subjected to the heat of the exhaust from the ancillary engines are made of stainless steel or other heat resistant alloy, and movable baffle member 19, also of heat resistant alloy, is provided at the lower aft end of engine 16 to insure that the products of combustion flow over the upper surface of flap 13.

For clarity, the foregoing description has been written with regard to a single engine 16, but it is to be understood that preferably a plurality of such engines are located in the first flap of each wing of the aircraft.

Since the flaps 12 and 13 are to be lowered into a deflected position when the airplane is to take off or land, the position of engines 16 will be such that there will be a substantial upward component of thrust therefrom, acting near the center of gravity (C.G.) of the airplane. This upward component of thrust is of course due to the fact that the exhaust gases from the engines are directed downwardly at a comparatively large angle with respect to the horizontal. Because of this fact, it will be seen that engines 16 contribute to the left of the airplane not only to the extent of increasing the aerodynamic lift of the wings but also to the extent of actually producing thrust having a substantial upward component.

In Figs. 2 and 2a is illustrated a portion of a typical actuation system that can be employed to move flaps 12 and 13 into the desired positions. At two or more locations along the length of wing is a flap actuating linkage 20 which extends chordwise, so as to lie generally in the plane of the wing ribs. A shaft 21 runs spanwise of the wing, and is rotated at a comparatively high speed (such as 1500 to 2000 r.p.m.) by means of a hydraulic motor or an electric motor (not shown). At each station along shaft 21 at which a flap actuating linkage is located, power takeoff means is provided, so that the several sections of linkages 20 in each wing can be operated simultaneously. That this may be done, a worm 22 that is rotated by shaft 21 is provided at each station along the wing at which a flap actuating linkage is located, and worm wheel 23 is directly geared to each worm 22. Each worm wheel can rotate about its own axis, but is restrained against longitudinal movement, and is internally threaded to threadedly receive a worm shaft 24. The relationship of each worm wheel 23 and worm shaft 24 is such that upon shaft 21 being rotated in one direction or the other, the worm wheel is caused to rotate without longitudinal movement, thereby to cause the respective worm shaft to move longitudinally within the worm wheel. Shaft 24 is prevented from rotating, so depending upon the direction in which the pilot of the airplane has caused the shaft 21 to rotate, worm shaft 24 is caused to move in one direction or the other between the positions shown in Figs. 2 and 2a so as to bring about the actuation of the flaps as desired.

Hingedly connected at the lowermost portion 26 of worm shaft 24, there is a curved link 25 that is pivoted at 28 to the forward portion 15 of first flap 12. To the end of link 25 that is remote from worm shaft 24 is rotatably connected large link 27, with the forward end of latter link being hingedly connected at 29 to fixed wing member 11. The arrangement is such that upon worm shaft 24 being moved downwardly, connection 26 is also caused to move downwardly, thereby moving curved link 25 and causing it to pivot about 28. Since the lower end of link 25 is connected to link 27, this motion of link 25 causes link 27 to pivot about point 29. Inasmuch as pivot point 28 is affixed to the forward portion 15 of first flap 12, the downward movement of worm shaft 24 causes first flap 12 to move downwardly to the position shown in Fig. 2a.

The foregoing arrangement is used so that worm shaft 24 can move longitudinally in virtually a straight line, rather than the lower connection of this shaft being caused to move in somewhat of a curved path, as would be the case in the event that connection 26 were directly affixed to forward portion 15 of flap 12.

According to the present arrangement, as first flap 12 is caused to deflect downwardly into a position in which the ancillary engines can be operated, second flap 13 is caused to rotate so as to open outlet 18, which, as previously mentioned, is located at the upper aft end of fixed flap 12. This rotation of second flap 13 takes place because of the action of flap positioning rod 32, whose forward end is rotatably connected at 30 to forward wing member 11, and whose rearward end is rotatably connected at 31 to link 33. The lowermost end of link 33 is pivotally connected at 34, near the lower aft end of first flap 12. Also connected at 31 is link 44, which extends rearwardly to fasten to second flap 13 at 35. Link 45 extends between connection points 34 and 35, so that members 33, 44 and 45 form a triangular framework that functions to support the second flap. This triangular framework is pivoted at 34, so upon flap 12 being moved downwardly, rod 32 is forced to pivot about point 30, thereby to cause the triangular framework to rotate in a clockwise direction about pivot point 34. As a result of this, connection point 35 is caused to move downwardly and rearwardly with respect to the aft end of first flap 12, in such a manner that second flap 13 is moved so as to expose outlet 18. Since preferably a plurality of ancillary engines are located in each first flap 12 of the airplane, it is to be understood that a number of such triangular frameworks are located along each first flap, to support the respective second flap.

If desired, each first flap can be subdivided in the spanwise direction into several flap sections, each such flap section containing, as an example, two ancillary jet engines. Similarly, each second flap can be divided into an equal number of sections in such a manner that a second flap section is associated with and supported by a respective individual first flap section. Note that this type of arrangement is shown in Fig. 5. For the embodiment shown in Figs. 1 to 2a, there would be at least two triangular frameworks consisting of members 33, 44 and 45, so placed as to support the ends of each second flap section in proper relation to the respective first flap section.

By virtue of a spanwise subdivision of the flaps into separate sections, if it is desirable to operate only some of the ancillary engines, it is necessary to deflect only the desired flap sections that their respective ancillary engines can be operated. This makes it unnecessary to deflect all of the flap sections when only some of the ancillary engines are to be operated. If an arrangement wherein flap sections can be selectively deflected is to be utilized, the operation thereof can be obtained by appropriate clutching arrangements in the power takeoff system so that the respective worm drive 22, 23 and 24 will be operated only for the flap sections that are to be deflected.

When a first flap has been lowered into the deflected position, the respective second flap will have been moved so as to be disposed in the full line position as illustrated in Fig. 2a. Although the outlet 18 for each ancillary engine has thereby been opened sufficiently that the engine can be operated, it may be desirable that the second flap 13 be deflected further, such as into the position shown in dashed lines in Fig. 2a. Such additional deflection of the second flap can be obtained according to this embodiment by causing the flap actuating rod 36 to move rearwardly so as to operate appropriate linkage, hereinafter described. Flap actuating rod 36 is operated by an actuating motor 41, the forward end of which is rotatably mounted to a rib of the forward wing member 11. The forward end of the rod 36 is attached to the rear end of motor 41, and inasmuch as this motor is preferably hydraulic and of the type that elongates upon being actuated in the flap-extending direction, the flap actuating rod 36 can be caused to move in somewhat a translatory motion.

The flap actuating rod 36 extends rearwardly in a chordwise direction and the rear end of this rod is connected at 39 to the upper end of a link 37. By appropriate means, the lower end of link 37 is connected at point 31 to the aforementioned triangular framework. One end of a link 38 is also connected at 39, and this link extends rearwardly to second flap 13, and is rotatably connected thereto at 42. Points 35 and 42 are connected by a link 43. Accordingly, when motor 41 has been actuated in the flap-extending direction, rod 36 is caused to move rearwardly, and this causes connection point 42 to move downwardly in a clockwise direction so as to move second flap 13 into the deflected position shown in phantom lines in Fig. 2a.

The foregoing linkage is so arranged that the area of outlet 18 is maintained constant over a wide range of positions of flap 13 with respect to flap 12. That such may be accomplished, the upper surface of the forward portion of flap 13 is at a constant radius with respect to pivot point 35, and it is because of this that the outlet opening will be constant except when flap 13 has been moved to a position approaching the position in which its longitudinal axis is in alignment with the axis of flap 12. As an example, the outlet area for each ancillary engine is approximately 101 square inches in the event that J-85 engines are used. In the event that first and second flaps that have been divided into separate longitudinal sections are employed, it may be desired to have a flap positioning mechanism (which is composed of rod 32 and the triangular framework) placed at each end of the flap section so as to form the support of the second flap, with a single flap actuating mechanism (which is composed of rod 36 and links 37, 38 and 43) placed in approximately the central portion of the flap sections, between two ancillary engines located in the section. In other words, although Figs. 2 and 2a reveal that all of the flap actuating linkage is located in approximately the same plane, such is not necessarily the case, for the flap actuating mechanism can be in a plane that is removed in the spanwise direction from the plane of the flap positioning mechanism.

Although this is the preferred means for actuating the flaps, it is to be understood that the flap-actuating linkage itself does not represent a portion of this invention, and another known type of actuating linkage could be used if desired. It is also to be understood that a power flap according to this invention could be utilized in an airplane having only a single flap on each wing, with the ancillary engines located in such flaps.

In Fig. 3 is shown a wing section of an aircraft in which a modification of my invention is being utilized. The wing section consists of a fixed forward wing member 51, a first flap 52, and a second flap 53. First flap 52 is movably connected to the rear edge of forward member 51 by means of hinges 54, and second flap 53 is movably connected to the rear edge of first flap 52 by means of hinges 55. Only one hinge 54 appears in this figure, but it is to be understood that either a single long "piano" hinge or a plurality of hinges of lesser length may be used as the movable connection between wing member 51 and flap 52.

As in Fig. 1, an engine is contained inside first flap 52, and it preferably is a small gas turbine engine 56 such as the General Electric J-85 engine, mounted so as to have its longitudinal axis substantially parallel with the longitudinal axis of the airplane when its flap is in the retracted position. An inlet 57 for engine 56 is provided on the upper side of the wing, between forward member 51 and first flap 52, so that when the first flap has been moved to a deflected position, sufficient air for satisfactory engine operation can be inhaled therethrough. Outlet 58 is provided at the aft end of first flap 52, and the outlet is located in such a position that when the flaps have been extended down into an operating position, the products of combustion emanating from engine 56 will flow over the upper surface of second flap 53 so as to induce the airstream to flow closely over the chordwise length of the upper surface of the respective wing without separation. By virtue of the position of inlet 57 on the upper surface of the wing, engine 56 will inhale through the inlet at least some of the boundary layer of the wing, so that, in effect, a boundary layer control system is created by this particular inlet-outlet arrangement.

The position of C.G. of a typical high wing transport airplane is shown at 59 in Fig. 3. The trapezoidally shaped figure 61 in which the C.G. is located indicates the extent to which the C.G. of the airplane may shift due to various loading conditions. It is to be observed that ancillary engine 56 is located very close to the C.G. of the airplane, and due to this positioning, when engine 56 is operating it will not create any intolerable degree of unbalanced moment. This reduces the need for large stabilizing surfaces to balance the airplane dynamically during flight.

Flaps 52 and 53 are moved to and from a retracted position by means of actuators 62 and 63 respectively. Actuator 62 is used to move first flap 52 with respect to forward member 51 and actuator 63 is used to move second flap 53 with respect to first flap 52. These actuators are preferably electrically operated screw jacks, inasmuch as this type of actuator not only permits the flaps to be moved to any of a large number of relative positions, but also the screw jack type actuator is "self locking"—that is to say, when the reversible electric driving motor that operates a jack is stopped, the jack cannot be moved to another position by external forces. However, it is to be understood that the type of actuator described in conjunction with Figs. 1 to 2a, or any other known type of actuator could be used in this modification if desired.

Actuator 62 is rotatably mounted at 64 on first flap 52, and consists of an actuator body 65, and a threaded shaft 66 movable in and out of the actuator body as a result of the rotation of a gear (not shown) that is internally threaded to receive shaft 66. The end of shaft 66 that is remote from body 65 is rotatably connected to fixed forward member 51, so that upon the electric motor contained in actuator body 65 being operated to rotate the internally threaded gear (also contained in the actuator body) in the desired direction, the first flap 52 can be caused to move toward or away from the retracted position.

Actuator 63, which is used to move second flap 53 with respect to first flap 52, is preferably an electric actuator of a type very closely resembling actuator 62. The forward end of actuator 63 is rotatably supported at point 71 near the aft end of first flap 52, and threaded shaft 69 that is movable in and out of this actuator is directly connected to second flap 53 by means of rotatable connection 67.

Second flap 53 is supported by hinge 55 from first flap 52 in such a manner that the area of outlet in 58 is constant over a wide range of positions of flap 53 with respect to flap 52. This is a result of the fact that hinge point 68 is located on second flap 53 a substantial distance rearward of its forward edge. The upper surface of the forward portion of flap 53 is at a constant radius with respect to hinge point 68, and it is because of this that outlet 58 will remain at virtually constant area except when flap 53 is moved to a position approaching the position in which its axis is in alignment with the axis of flap 52.

A power flap according to this invention has very broad application in its use in aircraft as a thrust producing arrangement to be used primarily during low speed flight. For instance, a power flap arrangement can be used in conjunction with one or more comparatively large jet engines that form the principal thrust producing means for the aircraft, or as an alternative, can be used in an airplane having a number of turboprop engines or piston engines that drive propellers. A portion of an aircraft having turboprop engines is shown in Fig. 4. In the event this invention is utilized in the latter type of airplane, it is to be realized that the wings of such an airplane obtain a substantial amount of lift due to the deflected position of the first and second flaps, because of a downward deflection of a considerable portion of the slipstream emanating from the propellers of the principal engines. The previously-mentioned NACA Technical Note 3307 is of particular interest with respect to this facet of the invention, inasmuch as the exemplary airplane shown in Fig. 4 is equipped with double plain flaps that are arranged so as to be directly behind the slipstream of the propellers, and this arrangement bears a resemblance to the arrangement investigated in the Technical Note. In the reported NACA test, double plain flaps were used, one being a 60-percent-chord flap attached to the rear edge of the fixed forward portion of the wing, and the other being a 30-percent-chord flap attached to the rear portion of the 60-percent-chord flap. In this investigation it was found that under static thrust conditions, a maximum upward rotation of the effective thrust vector of 45° was obtained with the 60-percent-chord flap deflected 30° and the 30-percent-chord flap deflected 50°. Utilizing the optimum configuration that was described in this Technical Note (which in addition to the two flaps, involved the use of two auxiliary vanes above the upper surface of the wing), it was calculated that vertical takeoff could be made with the airplane at a 23° take-off attitude and at airplane weights up to 95% of the thrust.

In Fig. 3, various force vectors $F_P$, $F_J$, $L_P$, $L_J$, and $R_T$ are shown. These vectors respectively represent the principal propeller thrust of the airplane, the ancillary jet engine thrust, the normal force produced by propeller slipstream flowing over the wing, the normal force produced by ancillary jet engine exhaust flowing over the second flap, and the total resultant force. Although a propeller is not shown in Fig. 3, it is to be understood that vector $F_P$ represents the thrust of the propeller or propellers of an airplane arrangement such as shown in Fig. 4.

Because the outlets of the ancillary engines are so located that the exhaust from these engines flows over the upper surface of the second flap, the lift characteristics of the entire wing configuration are enhanced. This takes place partly due to supercirculation, and partly due to a boundary layer control effect.

One of the dashed lines in Fig. 3 is composed of long dashes and this line extends upwardly at a steep angle from the leading edge of the wing, then across the wing in the form of an undulating curve, and then extends downwardly to the trailing edge of the second flap. This is indicative of the chordwise pressure distribution on the wing that is created by the propeller slipstream. The dashed line that is composed of short dashes also extends from the leading edge of the wing, but it follows closely along the surface of the wing for a substantial distance along the wing. However, this latter dashed line moves away from the wing as it approaches the second flap, so that at the trailing edge of the second flap, it is a substantial distance away from the flap. Said latter dashed line is indicative of the chordwise pressure distribution on the wing that is created by the flow of exhaust products over the second flap. Because of this latter pressure distribution, the negative pressure above the main part of the wing is substantially increased, thereby increasing the lift of the wing. In addition to the fact that the flow of exhaust gases over the second flap causes an increase in the lift of the wing, the ancillary jet engines in the modification shown in Fig. 3 inhale from the upper surface of the wing, and therefore have the effect of sucking off the boundary layer that would otherwise exist along the upper forward surface of the wing.

The jet exhaust flowing from the ancillary engines forms a comparatively thin layer of air (not shown), which otherwise will be referred to as a "jet stream." This jet stream has a momentum density considerably higher than that of the air flowing over the other portions of the wing, and this jet stream continues to maintain its identity for quite a distance downstream of the trailing edge of the second flap. This serves to increase the lift of the wing in two ways:

(1) The exhaust gases from the ancillary engines form an air layer across which a finite pressure differential can exist, and this makes it possible for a large negative pressure distribution to exist over the upper surface of the entire chordwise length of the wing, in the manner seen in Fig. 3. This is contrary to the conditions associated with an ordinary airfoil configuration, wherein only the wing itself can sustain a pressure differential. The principle involved in the present instance has been referred to as supercirculation.

(2) The flow of exhaust gases from the ancillary engine alleviates the tendency of the basic flow to separate from the wing, be re-energizing the boundary layer. This may properly be termed boundary layer control.

It is, of course, realized that the pressure differential existing across the jet stream is not lift, but merely the force required to bend the jet stream over into the horizontal direction. This pressure differential does, however, serve to enlarge the area that is representative of the negative pressure distribution over the upper surface of the wing, and as a matter of fact, makes it possible for a substantial negative pressure to exist at the trailing edge of the second flap, where it serves to increase the lift of the wing quite materially. Note in Fig. 3 the representation by the short-dash curve of the negative pressure that exists at the trailing edge of the wing. This is contrary to the case of the airfoil configurations used in the past, for ordinarily the circulation laws require that no pressure differential exist at the trailing edge of the wing.

Turning now to Fig. 4, there is shown a side elevation view of a transport type airplane in which my invention is being utilized, this view being taken so as to show part of the left wing of the airplane in section, with the flaps in the deflected position and ancillary jet engines 56 operating. This airplane is of the high-wing transport type. Inasmuch as the ancillary engines 56 inhale from the upper surface of the wings in accordance with the modified form of this invention, the principal engines have their exhaust located on the under-side of the wings to prevent the ancillary engines from inhaling these exhaust products. In the event that the principal embodiment of this invention is employed in this type of airplane, it would be preferred that the exhaust from the principal engines being delivered over the upper surface of the wings, inasmuch as the ancillary engines 16 of the principal embodiment inhale from the lower surface of the wings.

In Fig. 4 there are several force vectors that are applied in much the same manner as similar vectors in Fig. 3. However, the vectors of Fig. 4 are placed so as to illustrate the inter-relationship of the various forces. For example, the vectors $F_P$ and $L_P$ are drawn from a common point, and a parallelogram has been constructed therearound to illustrate the derivation of the resultant vector $R_P$. Similarly, vector $F_J$ and $L_J$ are drawn from a common point to show the derivation of the resultant vector $R_J$.

In the lower portion of this figure, the intersection point of vectors $R_P$ and $R_J$ are shown, and from such point, the total resultant vector $R_T$ is drawn to illustrate how the total effect of these forces is virtually straight upward, which is an indication of the great lift that is obtainable by a power flap arrangement according to this invention. So that vector $R_T$ can be correlated with the individual vectors and with Fig. 3, $R_T$ is also shown in a location adjacent to the aforementioned vectors $F_P$, $L_P$, etc. It is noteworthy that in Fig. 4 the propeller slipstream from the principal engines is shown as being deflected downwardly at a substantial angle. This is, of course, a result of the first and second flaps being positioned in the slipstream, as previously discussed.

Turning to Fig. 5, there is shown a plan view of the left wing 80 of the transport airplane shown in Fig. 4, this airplane being powered by four turboprop engines, with two of these, engines 81 and 82, appearing on wing 80. It should be understood, however, that this invention is not restricted to use in this type of airplane, for it is obvious that this invention could be utilized in airplanes having piston engines, jet engines, or any known combination thereof.

In Fig. 5, there appear ten ancillary air-breathing jet propulsion devices located in the first flap of wing 80, and in this instance, each of these engines are identical to the engine 56 illustrated in Fig. 3. As previously mentioned, these ancillary engines are operated only during low speed flight, such as during landing or takeoff, with the four principal engines supplying the thrust for this airplane during high speed flight. The ancillary engines are located inboard of ailerons 83, and as long as a similar number of ancillary engines are operated in the right and left wings of the airplane, the control of the airplane is not adversely affected. As a matter of fact, a non-operating engine in one wing could be compensated for by shutting off its counterpart in the opposite wing, or else by a certain positioning of the flaps of the other wing. In view of the fact that there are five different spanwise flap sections in each wing, a large number of combinations of engines operating and flap positions is obtainable. As previously mentioned, only selected ones of flap sections 91, 92, 93, 94 and 95 need be operated.

In the arrangement shown in Fig. 5, the aileron 83 and its counterpart on the other wing of the aircraft (not shown) are what may be termed "composite ailerons." By this it is meant that the ailerons of this airplane are used during the takeoff and landing regimes both as flaps and as ailerons. In order that they may be so utilized, aileron 83 and its counterpart are placed at a basic deflection of approximately 30° to 40° just before takeoff or landing, the arrangement being such that the aileron of one wing is moved up and the aileron of the other wing moved down (usually this is a lesser degree) from this basic deflection point in order to produce a rolling moment for the airplane.

Also shown in this figure is an arrangement whereby some of the exhaust gases from the ancillary engines is utilized to provide boundary layer control over the part of wing 80, that is adjacent the ailerons. A duct 84 is provided to conduct exhaust gases (or, alternately, compressor bleed air) from each engine to a large duct 85 that runs longitudinally of the wing. Duct 85 has a configuration such that it connects to a manifold 86 that is located along the outboard section of the wing that is contiguous to aileron 83. Provided in spaced locations along the rearward edge of manifold 86 is a series of slots through which the exhaust gases (or bleed air) from the ancillary engines can be directed over the upper surface of aileron 83. These slots, which do not appear in Fig. 5, are much smaller than the dimension of outlet 58 that appears in Fig. 3, inasmuch as the quantity of exhaust gases that flow through each slot is, by comparison, small. It has been found that only 5% to 10% of the total air flowing through the ancillary engines will be required for achieving highly desirable flow conditions over the upper surface of the ailerons.

As previously mentioned, when a comparatively large number of ancillary jet engines are used in an airplane in the manner previously described, the lifting capabilities of the wing-power plant combination are about 6 to 8 times as high as the lift obtainable from the basic wing with conventional wing flaps. In the case of a transport aircraft, this results in a very substantial reduction in wing size, and accordingly, results in a reduction in the weight of both the basic airframe and of the fuel that has to be carried in order to fly a given distance.

If desired, a portion of the exhaust gases or bleed air obtained from the ancillary engines can be utilized for improving the flow conditions over the tail surfaces of the airplane. That this may be done, duct 87 is provided which leads from duct 85 back to the tail surfaces. In much the same manner described with regard to manifold 86 and aileron 83, the exhaust gases can be used to achieve boundary layer control over the various tail surfaces. Valve 88 permits the appropriate person inside the airplane to determine whether or not the exhaust gases are allowed to flow through duct 87 to the tail, and also permits a proportioning of exhaust gases between ducts 86 and 87 if such be desired.

Shown in Fig. 5 is a portion of a duct 89 that leads from a suitable location in turboprop engine 82 rearwardly to the ancillary engines. This duct permits high pressure air or exhaust gases to be conducted to the ancillary engines for starting purposes. Each of these engines preferably has a starting arrangement in the form of blading placed around the outer periphery of the turbine wheel, so that when valve 90 is opened to allow high pressure air from duct 89 to be directed upon the blades, the compressor and turbine of the ancillary engine are rotated to a speed at which the engine can easily be started. Appropriate valving arrangements (not shown) make it possible for the high pressure air from engine 82 to successively start each of the ancillary engines in the left wing and correspondingly, air from one of the principal engines of the right wing of the airplane is used for starting the ancillary engines in that wing.

In Fig. 6, a fragmentary plan view of a portion of the wing of Fig. 5 is illustrated, this figure revealing the location of actuators 62 and 63 intermediate the two ancillary engines that are located in each flap section. This positioning of the actuators is the preferred arrangement, but it is to be understood that another actuator arrangement could be used if desired.

According to another feature of this invention, the construction of the first flaps is such that the ancillary engines can be removed individually in the same general manner shown in Fig. 7 when it is necessary to service or replace an engine. Each ancillary engine is supported by an engine mounting structure 96 that is connected to the lower surface of a panel 97 that forms a portion of the upper skin of the first flap of the wing. Additional panels 98, 99, 100 and 101 are placed at spaced locations along the wing, and from each of these panels an ancillary engine is suspended. The wing ribs form the support for the panels, and in this instance, mounting plates 103 attached to ribs 106 and 107 form the support for panel 97. Tapped holes 104 are located at spaced intervals along the mounting plates 103, and holes 105 are spaced at identical intervals around the outer edges of panel 97 in such a manner that when the panel 97 has been placed in position in the wing, the holes 105 are lined up with the tapped holes 104 so that bolts or similar means (not shown) can be placed in holes 105 and screwed into holes 104 to hold the panel firmly in position.

By virtue of the simplicity of this construction, if it is desired to remove an ancillary engine from the wing of the airplane, it is only necessary to remove the bolts or other fastening means, and after the control lines, fuel lines and other such lines have been separated, the panel and its respective engine can be removed directly upward. Similarly, each engine 16 of the preferred embodiment shown in Figs. 1 to 2a can be supported either from the upper skin or the lower skin of the first flap, whichever is more convenient.

Ribs 106 through 112 are to be seen in Fig. 7. It will be noted that ribs 108 and 109 are contiguous, ribs 111 and 112 are contiguous, with ribs 107 and 110 located in the intermediate portion of their respective flap sections. This construction is occasioned by the fact that there is more than one flap section illustrated in Fig. 7 and it is preferred that there be a movable portion of a rib at each end of a flap section. Therefore, ribs 106 and 108 form the ends of one flap section, ribs 109 and 111 form the ends of the adjacent flap section, and so forth.

The operation of an airplane equipped with my wing arrangement is as follows:

The primary engines are started, which serve as a source of supply of high pressure air for the starting of the ancillary engines, as well as a supply of electric and/or hydraulic power for the deflection of the flaps. Then the flaps are deflected so that the ancillary engines can be operated, and valve 90 in line 89 (Fig. 5) is opened so that high pressure air can be used for starting the ancillary engines. Provisions are made on each ancillary engine in the nature of a centrifugally operating electric valve so that the valve of each such engine can be opened for starting, and when the engine has been rotated to a sufficiently high speed, the valve is automatically closed by the action of the centrifugal feature of the valve, to shut off the flow of high pressure air from the principal engine to that particular ancillary engine. If desired, valve 90 can be operated as a consequence of the deflection of a flap section, so that upon the operation of the flaps, starting air from the principal engine is automatically sent to the ancillary engines. If desired, an arrangement can be utilized that will shut off an ancillary engine located in one wing if its counterpart in the opposite wing fails. Such an arrangement might be particularly desirable to utilize during take off, for it would prevent a sudden unbalance of thrust forces, which would produce a rolling moment that of course, would be very difficult to deal with during take off.

Although this invention has been described with regard to a spanwise division of the first and second flaps into separate sections, it is to be understood that such a subdivision is not required, for the flaps of each wing can be continuous throughout their length within the purview of this invention.

It will be understood that the new features herein disclosed and set forth in the appended claims may be employed in ways and forms different from those in the preferred embodiments described above and illustrated in the drawings, without departing from the contributions of this invention.

I claim as my invention:

1. In a winged aircraft equipped with wing flaps, a lift-producing arrangement including at least one air-breathing jet powerplant mounted in a wing flap of each wing of the aircraft, said wing flaps, when in a deflected position, exposing appropriate air inlets for the operation of said powerplants, said inlets being located below the line of the hinges connecting each flap to its respective wing member, outlets for the exhaust gases from the powerplants located on the upper surface of the wings adjacent the trailing edges, the exhaust gases emanating from said outlets having a substantial downward velocity component when said flaps have been deflected, said gases flowing over said trailing edges so as to induce the airstream to flow closely over the chordwise length of the upper surface of the respective wing without separation.

2. In a winged aircraft having wing flaps, a lift-producing arrangement including at least one air-breathing jet powerplant mounted in a wing flap of each wing of the aircraft, each of said wings having a fixed forward wing member and first and second flaps capable of being deflected downwardly, said jet powerplants being located in said first flaps, with each of said first flaps being hinged to the rearward portion of its respective forward member and each second flap being hinged to the rear edge of its respective first flap, said flaps, when in deflected position, exposing appropriate inlets and outlets for the operation of said powerplants, said inlets being located below the line of the hinges connecting the first flap to said forward member and said outlets being located above the line of the hinges connecting the second flap to said first flap, the exhaust gases emanating from said outlets having a substantial downward velocity component due to the deflected positions of said flaps, said gases flowing over the upper surface of the respective second flap so as to induce the airstream to flow closely over the chordwise length of the upper surface of the respective wing without separation.

3. In a winged propeller-driven aircraft having wing flaps, an ancillary lift-producing arrangement to be used primarily during takeoff and landing, including at least one air-breathing jet powerplant mounted in a wing flap of each wing of the aircraft, each of said wings having a fixed forward member and first and second flaps capable of being deflected downwardly, said jet powerplants being located in said first flaps, with each of said first flaps being hinged to the rearward portion of its respective forward member and each second flap being hinged to the rear edge of its respective first flap, said flaps, when in deflected position, exposing appropriate inlets and outlets for the operation of said powerplants, said inlets being located below the line of the hinges connecting the first flap to said forward member and said outlets being located above the line of the hinges connecting the second flap to said first flap, the exhaust gases emanating from said outlets flowing over the upper surface of the respective second flap so as to induce the airstream to flow closely over the chordwise length of the upper surface of the respective wing without separation, said exhaust gases from said devices having a substantial downward velocity component due to the deflected positions of said flaps, the deflected position of said flaps also causing the slipstream from said propellers to be redirected downwardly.

4. In a winged aircraft equipped with wing flaps, a lift producing arrangement including a plurality of air breathing jet powerplants mounted in a wing flap in each wing of the aircraft, said wing flaps, when in deflected position, exposing air inlets through which air may be inhaled by said powerplants, said inlets being located below the line of hinges connecting each flap to its respective wing member, outlets for the exhaust gases from the powerplants located on the supper surfaces on the wings adjacent to the trailing edges thereof, the exhaust gases emanating from said outlets having substantially downward components when said flaps have been deflected, said powerplants being located so that said components are close to the center of gravity of said aircraft to minimize the need for large stabilizing surfaces at the tail of the aircraft, thereby to balance it dynamically, said gases flowing over said trailing edges inducing the airstream flowing over said wings to flow closely over the chordwise length of the upper surface of the wings, essentially without separation.

5. The lift producing arrangement as defined in claim 4 in which each powerplant is individually mounted on a panel of the skin of its wing flap so that each of said powerplants can be removed individually from its location in the flap by removing its respective panel from the wing.

6. The lift-producing arrangement as defined in claim 4 in which each of said wing flaps accommodating a powerplant is subdivided in a spanwise direction so as to form a plurality of wing flap sections that provide lift, and means for individually and selectively deflecting said flaps into the operative position.

7. In a winged aircraft having wing flaps, a lift-producing arrangement including a plurality of air-breathing jet powerplants mounted in a wing flap of each wing of the aircraft, each of said wings having a fixed forward wing member and first and second flaps capable of being deflected downwardly, said powerplants being located in said first flaps, said wing flaps, when in deflected position exposing appropriate air inlets for the operation of said powerplants as well as outlets through which the exhaust products from said powerplants may flow, said outlets being arranged so that said exhaust products can flow over the upper surface of said second flaps, each of said wing flaps being subdivided in a spanwise direction so as to form a plurality of wing flap sections, at least two of which sections in each wing contain a jet powerplant, and means for individually and selectively deflecting said wing flap sections into operative positions so that the lift of each wing may be closely controlled.

References Cited in the file of this patent

UNITED STATES PATENTS

| | | |
|---|---|---|
| 1,574,567 | Flettner | Feb. 23, 1926 |
| 2,439,048 | Koreff | Apr. 6, 1948 |
| 2,585,676 | Poisson-Quinton | Feb. 12, 1952 |

FOREIGN PATENTS

| | | |
|---|---|---|
| 55,382 | France | Jan. 9, 1952 |
| | (1st addition to 971,992) | |
| 720,394 | Great Britain | Dec. 22, 1954 |